United States Patent
Keiser et al.

(10) Patent No.: US 6,372,806 B1
(45) Date of Patent: Apr. 16, 2002

(54) METHOD OF MAKING COLLOIDAL SILICA

(75) Inventors: Bruce A. Keiser; Maureen B. Nunn; Cheng-Sung Huang, all of Naperville; Dennis L. MacDonald, Wheaton, all of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/504,320

(22) Filed: Feb. 14, 2000

Related U.S. Application Data

(62) Division of application No. 09/036,104, filed on Mar. 6, 1998, now abandoned.

(51) Int. Cl.[7] .................. C01B 33/141; C01B 33/12; B01F 3/12
(52) U.S. Cl. ............... 516/82; 423/338; 106/432; 162/168.1; 162/181.6
(58) Field of Search .............. 516/82; 423/338; 106/432; 162/168.1, 175, 181.6

(56) References Cited

U.S. PATENT DOCUMENTS

| | | | |
|---|---|---|---|
| 2,244,325 A | 6/1941 | Bird .................. | 516/83 |
| 3,582,502 A | 6/1971 | Farrow et al. ......... | 521/55 |
| 4,385,961 A | 5/1983 | Svending et al. ....... | 162/175 |
| 4,753,710 A | 6/1988 | Langley et al. ........ | 162/164.3 |
| 4,795,531 A | 1/1989 | Sofia et al. .......... | 162/164.6 |
| 4,954,220 A | 9/1990 | Rushmere ............. | 162/175 |
| 5,277,764 A | 1/1994 | Johansson et al. ...... | 162/175 |
| 5,279,807 A | 1/1994 | Moffet et al. ......... | 423/338 |
| 5,368,833 A | 11/1994 | Johansson et al. ..... | 423/338 |
| 5,447,604 A | 9/1995 | Johansson et al. ..... | 162/181.6 |
| 5,571,494 A | 11/1996 | Saastamoinen ......... | 423/338 |
| 5,603,805 A | 2/1997 | Andersson et al. ..... | 162/168.3 |
| 5,643,414 A | 7/1997 | Johansson et al. ..... | 162/164.6 |
| 5,964,693 A | * 10/1999 | Brekau et al. ........ | 516/82 |

FOREIGN PATENT DOCUMENTS

| | | |
|---|---|---|
| WO | WO 96/30591 | 10/1996 |
| WO | WO 97/16598 | 5/1997 |

OTHER PUBLICATIONS

Ralph ller, The Chemistry of Silica, Copyright 1979 (Wiley & Sons, NY, NY) pp. 3–12, 1979 (month unknown).*
Anal. Chem., 28, 1981 month unknown (1956), Sears, Jr.
Iler and Dalton. J. Phys. Chem. 60. 955, (Jul. 1956).

* cited by examiner

*Primary Examiner*—Daniel S. Metzmaier
(74) *Attorney, Agent, or Firm*—Margaret M. Brumm; Thomas M. Breininger

(57) ABSTRACT

Disclosed are stable, aqueous colloidal silicas having surface area of greater than 700 m²/g and S-values of from 20–50. These colloidal silicas do not require treatment with surface treatment agents such as aluminum to achieve stability. These colloidal silica aquasols can be produced and stored at concentrations of greater than 7 percent by weight $SiO_2$ solids, and even as high as 15 percent by weight solids or higher, and remain stable at room temperature for at least 30 days compared to art-known silica aquasols. These colloidal silica sols demonstrate advantageously improved performance over art-known colloidal silica sots in applications such as in drainage and retention in papermaking processes. Also disclosed are processes for making aqueous colloidal silicas of the invention and the use of such colloidal silicas in papermaking processes.

11 Claims, No Drawings

METHOD OF MAKING COLLOIDAL SILICA

CROSS-REFERENCE TO RELATED PATENT APPLICATION

This application is a divisional of U.S. patent application Ser. No. 09/036,104, filed Mar. 6, 1998, now abandoned entitled, "STABLE SILICA SOLS OF HIGH SURFACE AREA AND IMPROVED ACTIVITY", now abandoned.

BACKGROUND OF THE INVENTION

The present invention is directed to colloidal silica sols having high surface area and enhanced stability. It is also directed to processes for making such colloidal silica sols and to the use of such colloidal silica sols in the production of paper. The colloidal silica sols of the present invention uniquely exhibit this stability at such high surface area without modification of the surface with, for example, aluminum. Moreover, the colloidal silica sols of the present invention exhibit such enhanced stability at relatively high solids contents. Furthermor, the colloidal silica sols of the present invention advantageously exhibit excellent activity not only in alkaline furnishes but also in acid furnishes in papermaking. The silica sols of the present invention are useful, among other areas, in the papermaking industry, for example, as retention and dewatering aids.

U.S. Pat. Nos. 5,643,414 and 5,368,833 describe a colloidal silica microparticle consisting of high surface area, i.e.. greater than 700 $m^2/g$ and an S-value between 20 and 40 which is useful in papermaking. These patents teach the need for surface treatment of the colloidal silica particle with aluminum in order to stabilize the surface area and thereby the product. U.S. Pat. No. 5,603,805 also describes a colloidal silica having a surface area less than 700 $m^2/g$ and with an S-value of 20 to 40 which can be used in the making of paper. This patent clearly teaches that surface areas of less than $700m^2/g$ are needed in order to obtain a stable colloidal silica product without aluminum surface treatment that is useful in the paper making application.

In contrast, the present invention provides a stable composition of colloidal silica that is useful in the application of making paper and has a surface area greater than $700m^2/g$ and has an S-value of 20 to 50. Contrary to the teachings of the above-referenced patents, the present invention advantageously provides a colloidal silica that remains stable without the addition of surface aluminum.

SUMMARY OF THE INVENTION

The present invention provides for a stable colloidal silica having a surface area of greater than $700m^2/g$. preferably greater than $750m^2/g$, and most preferably greater than greater than $800m^2/g$. and an S-value of from 20–50, preferably from 20–40. Colloidal silicas of the present invention do not require surface treatment with surface treatment agents such as aluminum to achieve stability. As used herein, a stable colloidal silica is defined as one whose surface area remains above $700m^2/g$ and whose S-value remains in the range of from 20–50 as the concentrated product is aged at room temperature for a period of at least 30 days, preferably for a period of at least 60 days. The colloidal silica aquasols of the present invention can be produced and stored at concentrations of greater than 7 percent by weight $SiO_2$ solids. and even as high as 15 percent by weight $SiO_2$ solids or higher, and remain stable at room temperature for at least 30 days, typically for at least 60 days, compared to art-known silica aquasols. Moreover, colloidal silica sols of the present invention demonstrate advantageously improved performance over art-known colloidal silica sols in applications such as papermaking. For example, colloidal silica sols of the present invention which are made of only silica have shown enhanced activity not only in alkaline furnishes but unexpectedly also in acid furnishes in papermaking.

The present invention also provides processes for making a colloidal silica of the present invention having a surface area of greater than $700m^2/g$ and an S-value of from 20–50. One process comprises: (a) forming an initial composition (or heel) containing water, an alkali metal silicate having a mole ratio of $SiO_2$ to alkali metal oxide in the range of from 15:1 to 1:1 and a pH of at least 10, typically at least 11, and an acid (and/or a corresponding salt thereof). the alkali metal silicate and acid being initially present in a ratio by weight of at least 63:1, while maintaining the temperature of the initial composition below 100 degrees F. preferably below 85 degrees F, typically from 60–85 degrees F.: (b) slowly and continuously adding to the initial composition an aqueous silicic acid composition typically having a $SiO_2$ content in the range of from 5.0 to 7.2 percent by weight, preferably from 6.0 to 6.8 percent by weight, while maintaining the temperature of the composition below 100 degrees F., typically from about 60–85 degrees F., until from one-half to three-quarters of the silicic acid composition has been added to the initial composition: (c) thereafter, slowly increasing the temperature of the composition, for example over a period of from about 10–35 minutes, to from 115–125 degrees F. and maintaining the temperature until the addition of the silicic acid composition is complete; (d) optionally, maintaining the temperature of the composition below 125 degrees F., typically from 115 to 125 degrees F. for about an hour; and (e) thereafter discontinuing the heating and optionally removing water from the resulting composition until the solids content based on $SiO_2$ of the resulting composition is 7 percent by weight or higher, typically 11 percent by weight or higher.

An alternative process for preparing aqueous silica sols of the present invention entails the use of a cationic ion exchange resin to initiate the reaction of the alkali metal silicate (see Example 3 below). The reaction is controlled by the rate of addition (for example, from 0 to 30 minutes, typically less than 15 minutes) and the ratio of alkali metal silicate to ion exchange resin during the polymerization to produce the colloidal silica. The molar ratio of hydrogen ion in the cationic ion exchange resin to alkali metal ion in the alkali metal silicate ranges from 40 to 100 percent, preferably from 50 to 100 percent. The temperature during colloidal silica formation in this alternative embodiment of the invention generally ranges from 50 degrees F. to 100 degrees F., preferably from 70 degrees F. to 90 degrees F. Heat treatment of the colloidal silica product (i.e., post treatment) is optional in this embodiment of the process of the invention.

DETAILED DESCRIPTION OF THE INVENTION

The invention provides for the manufacture a colloidal silica product having a surface area via Sears Method, see Anal. Chem., 28, 1981(1956), of greater than $700m^2/g$, preferably greater than $750m^2/g$, and most preferably greater than $800m^2/g$, an S-value, see Iler and Dalton, J. Phys. Chem., 60, 955(1956), of less than 50, preferably from 20 to 50, and most preferably from 20 to 40, and a percent by weight solids concentration of between 7 and 20% silica i.e., $SiO_2$.

One process consists of the preparation of an initial composition ("heel"), followed by addition of a source of active silica, usually in the form of silicic acid or polysilicic acid, over a specified time. During the addition of the active silica, the reaction temperature is controlled within a specified reaction temperature profile. Once the prescribed amount of active silica is added, the mixture can be concentrated. The concentration process can be carried out using a variety of methods. Such methods may include, but are not limited to evaporation and/or membrane separation techniques such as ultrafiltration or microfiltration. The water is removed until the final product contains from 7 to 20% by weight $SiO_2$.

In the above process, the initial heel is composed of water, any of a number of commercially available silicates or alkali water glasses, and an acid and/or a corresponding salt thereof in a prescribed ratio. While the order of addition is not important, for purposes of ease of manufacture, it has been discovered that the acid should be added to the dilution water, prior to the addition of the silicate.

The alkali water glasses or silicates can be any number of conventional materials. These are normally potassium or sodium salts. The mole ratio of $SiO_2$ to $Na_2O$ or $K_2O$, can be in the range from 15:1 to 1:1 and is preferably within the range of from 2.5:1 to 3.9:1. Such water glass solutions typically will have a pH in excess of 10, typically around 11.

The acid used in the above process can be any number of organic or mineral acids. Examples of such acids include, but are not limited to: mineral acids such as hydrochloric, phosphoric or sulfuric or such materials as carbon dioxide. Organic acids include but are not limited to: acetic acid, formic acid and propionic acid. Examples of suitable salts include: sodium sulfate. sodium acetate, potassium sulfate, potassium acetate, trisodium phosphate and sodium monohydrogen phosphate.

Once the heel is prepared in the above process, the temperature of the composition is reduced to 85 degrees F. or lower, typically to 80 degrees F. or lower, and usually in a range of from 60 to 85 degrees F. At this point, silicic acid or poly silicic acid is slowly added to the composition, for example over a total period of about 4 hours. Silicic acid suitable for the present invention can he prepared via known methods in the art, such as the cation exchange of dilute solutions of alkali water glasses as described above. Typically, the dilute solutions contain from 3 to 9% by weight solids based on $SiO_2$, typically from 5.0 to 7.2 percent by weight, and preferably from 6.0 to 6.8 percent by weight. Typical commercial preparations are outlined in U.S. Pat. Nos. 3,582,502 and 2,244,335, the disclosures of which are hereby incorporated by reference. While the ratio by weight of the alkali metal silicate to acid can vary, typically the ratio is at least 63:1. The silicic acid or poly silicic acid is slowly and continuously added to the composition with stirring, until from about one-half to about three-quarters of the silicic acid or poly silicic acid has been added to the composition while maintaining the temperature of the composition below 85 degrees F., typically from about 60–85 degrees F. Thereafter, the temperature of the composition is slowly raised, for example over a period of from 10 to 35 minutes, to from 115–125 degrees F. and held in this temperature range until the addition of the remainder of the silicic acid or poly silicic acid to the composition is complete. Optionally thereafter. the temperature of the composition can be maintained at below 125 degrees F. typically from 115 to 125 degrees F. for about an hour. If desired, water can thereafter be removed from the composition by known procedures until the solids content of the composition is 7 percent by weight or higher, typically from 11 percent by weight or higher.

The following is an alternative process for preparing aqueous silica sols of the present invention. It entails the use of a cationic ion exchange resin, preferably a weak acid cationic ion exchange resin. to initiate the reaction of the alkali metal silicate (see Example 3 below) to produce the colloidal silica. The reaction is controlled by the rate of addition and the ratio of alkali metal silicate to ion exchange resin during the polymerization to produce the colloidal silica. Heat treatment of the colloidal silica product is optional in this embodiment of the process of the invention.

The alternative process for preparing a stable colloidal silica sol of the invention comprises: (a) charging a reaction vessel with a cationic ion exchange resin having at least 40 percent, preferably at least 50 percent, of its ion exchange capacity in the hydrogen form wherein the reaction vessel has means, for example a screen near the bottom of the reaction vessel, for separating the colloidal silica formed during the process from the ion exchange resin: (b) charging the reaction vessel (essentially all at once) with an aqueous alkali metal silicate having a mole ratio of $SiO_2$ to alkali metal oxide in the range of from 15:1 to 1:1 and a pH of at least 10.0, preferably at least 11; (c) stirring the contents of the reaction vessel until the pH of the contents of the vessel is in the range of from 8.5 to 110, preferably from 9.2 to 10.0; (d) adjusting the pH of the contents of the reaction vessel to above 10.0. preferably from 10.4 to 10.7, utilizing an additional amount of the alkali metal silicate: and (e) separating the resulting colloidal silica of the invention from the ion exchange resin while removing the colloidal silica from the reaction vessel. The adjustment of pH in step (d) can he carried out either in the reaction vessel or after the resulting colloidal silica has been removed from the reaction vessel. This adjustment of pH typically is carried out within 10 minutes to 3 hours from when step (e) has been completed.

Colloidal silica compositions of the invention have been shown to be from 20 to 40 percent more effective as a drainage and retention aid in the papermaking process compared to prior art known compositions. Moreover, the compositions of the present invention have been shown to unexpectedly exhibit activity in areas where art known compositions have not been active, primarily in acid furnishes for the papermaking process. While the preferred utility for colloidal silica compositions of the invention is as a drainage and retention aid in the manufacture of paper, compositions of the invention may be utilized for other purposes, for example, for beer, wine, juice, and sugar clarification; water clarification including raw and waste water clarification; as catalyst supports; as a component of coating compositions; as a coating component for plastics; as an abrasion resistant coating component; for investment casting; as a component of ceramic fireplace logs; and in refractory materials.

Accordingly, the invention further comprises a method of improving the production of paper which comprises the step of adding to a paper mill furnish from about 0.00005 to about 1.25 percent by weight based on the dry weight of fiber in the slurry or furnish of a colloidal silica of the invention. In an alternative embodiment, a nonionic, cationic or anionic polymeric flocculant may be added to the furnish either before or after the addition of the colloidal silica in an amount of from about 0.001 to about 0.5 percent by weight based on dry weight of fiber in the furnish. A cationic starch may alternatively be added to the furnish in place of, or in addition to the synthetic polymer flocculant in an amount of from about 0.005 to about 5.0 percent by weight based on the dry weight of fiber in the furnish. More preferably, the starch is added in an amount of from about 0.05 to about 1.5 percent by weight based on the dry weight of fiber in the furnish. In yet another embodiment, a coagulant may be added to the furnish in place of, or in addition to, the flocculant and/or the starch in an amount of from about 0.005 to about 1.25 percent by weight based on the dry weight of fiber in the papermaking furnish. Preferably, the coagulant is added in an amount of from about 0.025 to about 0.5 percent by weight based on the dry weight of fiber in the furnish.

The invention is also directed to a method for increasing retention and drainage of a papermaking furnish on a papermaking machine which comprises the steps of adding to a papermaking furnish from about 0.00005 to about 1.25 percent by weight based on the dry weight fiber in the furnish of a colloidal silica of the invention. The colloidal silica may be added to the papermaking furnish along with a nonionic, cationic or anionic polymeric flocculant. The flocculant may be added either before or after the colloidal silica in an amount of from about 0.001 to about 0.5 percent by weight based on the dry weight of fiber in the furnish. Starch may alternatively be added to the furnish in place of or in addition to the flocculant in an amount of from about 0.005 to about 5.0 percent by weight based on dry weight of fiber in the furnish. If starch is utilized, it is preferably a cationic starch. When used, the starch is preferably added in an amount of from about 0.05 to about 1.25 percent by weight based on the dry weight of fiber in the furnish. In yet another embodiment, a coagulant may be added to the furnish in place of, or in addition to, the flocculant and/or the starch in an amount of from about 0.005 to about 1.25 percent by weight based on the dry weight of fiber in the furnish. Preferably, the coagulant is added in an amount of from about 0.025 to about 0.5 percent by weight based in the dry weight of fiber in the furnish.

The dosage of the polymeric flocculant in any of the above embodiments is preferably from 0.005 to about 0.2 weight percent based on the dry weight of fiber in the furnish. The dosage of the colloidal silica is preferably from about 0.005 to about 0.25 percent by weight based on the weight of dry fiber in the furnish, and most preferably from about 0.005 to about 0.15 percent by weight of fiber in the furnish.

It should be pointed out that since this invention is applicable to a broad range of paper grades and furnishes, the percentages given above may occasionally vary. It is within the spirit and intent of the invention that variance can be made from the percentages given above without departing from the invention, and these percentage values are given only as guidance to one skilled in the art.

In any of the above embodiments, bentonite, talc, synthetic clays, hectorite, kaolin, or mixtures thereof may also he added anywhere in the papermaking system prior to sheet formation. The preferred addition point is the thick stock pulp before dilution with whitewater. This application results in increased cleanliness of the papermaking operation which otherwise experiences hydrophobic deposition affecting both the productivity and the quality of paper.

In addition, any of the above embodiments may be applied to papermaking furnish selected from the group consisting of fine paper (which as used herein includes virgin fiber based as well as recycle-fiber based materials), board (which as used herein includes recycle-fiber based test liner and corrugating medium as well as virgin-fiber based materials), and newsprint (which as used herein includes magazine furnishes as well as both virgin fiber and recycle-fiber based), or other cellulosic material. These furnishes include those that are wood-containing. wood-free, virgin, bleached recycled, unbleached recycled, and mixtures thereof.

Paper or paperboard is generally made from a suspension of furnish of cellulosic material in an aqueous medium, which furnish is subjected to one or more shear stages, in which such stages generally are a cleaning stage, a mixing stage and a pumping stage, and thereafter the suspension is drained to form a sheet, which sheet is then dried to the desired, and generally low, water concentration. The colloidal silicas of the invention may be added to the furnish before or after a shear stage.

In addition to the retention and drainage aid applications described above, the colloidal silicas of the invention may be used in conjunction with standard cationic wet strength resins to improve the wet strength of cellulosic sheet so treated. When utilized in this manner the colloidal silica is added to the furnish prior to placement of the furnish, containing the wet strength resin, on a papermachine. The colloidal silica is generally utilized at the levels set forth above.

The colloidal silica of the invention has been found to significantly enhance the performance of synthetic polymeric flocculants and retention aids, and starch in the papermaking process. Further, the colloidal silicas are believed to have utility as additives in solids/liquids separation processes such as water pretreatment, and in wastewater treatment applications. The colloidal silicas of the invention in addition to enhancing drainage and retention in newsprint, fine paper, board and other paper grades, may also find utility in pitch and stickies control in papermaking, pulp dewatering in the production of dry-lap pulp, saveall and clarifier applications in pulp and paper mills, water clarification. dissolved air flotation and sludge dewatering. The compositions of the invention may also find utility in solid/liquid separation or emulsion breaking. Examples of such applications include municipal sludge dewatering, the clarification and dewatering of aqueous mineral slurries, refinery emulsion breaking and the like. The enhanced performance seen utilizing the colloidal silica sols of the invention in combination with synthetic polymers and or starch includes higher retention, improved drainage and improved solids/liquids separation, and often a reduction in the amount of polymer or starch used to achieve the desired effect.

Microparticle retention programs are based on the restoration of the originally formed flocs broken by shear. In such applications, the flocculant is added before at least one high shear point, followed by the addition of microparticle just before the headbox. Typically, a flocculant will be added before the pressure screens, followed by the addition of microparticle after the screens. However, a method wherein this order may be reversed is contemplated herein. Secondary flocs formed by the addition of microparticles result in increased retention and drainage without detrimentally affecting formation of the sheet. This allows increased filler content in the sheet, eliminates two-sidedness of the sheet, and increases drainage and speed of the machine in paper manufacturing.

The use of a slight excess of polymeric flocculant and/or coagulant is believed necessary to ensure that the subsequent shearing results in the formation of microflocs which contain or carry sufficient polymer to render at least parts of their surfaces positively charged, although it is not necessary to render the whole furnish positively charged. Thus the zeta potential of the furnish, after the addition of the polymer and after the shear stage, may be cationic or anionic.

Shear may be provided by a device in the apparatus used for other purposes, such as a mixing pump, fan pump or centriscreen, or one may insert into the apparatus a shear mixer or other shear stage for the purpose of providing shear, and preferably a high degree of shear, subsequent to the addition of polymer.

The flocculants used in the application of this invention are high molecular weight water soluble or dispersible polymers which may have a cationic or anionic charge. Nonionic high molecular weight polymers may also be utilized. These polymers may be completely soluble in the papermaking system, or alternatively may be readily dispersible. They may have a branched or crosslinked structure provided that they do not form objectionable "fish eyes", so called globs of undissolved polymer on the finished paper. Polymers of these types are readily available from a variety of commercial sources. They are available as dry solids, aqueous solutions, water-in-oil emulsions which when added to water allow the polymer contained therein to rapidly solubilize, or as dispersions of the water soluble or dispersible polymer in aqueous brine solutions. The form of the high molecular weight flocculant used herein is not deemed to be critical so long as the polymer is soluble or dispersible in the furnish.

As stated above, the polymers may be cationic, anionic, or nonionic. Cationic polymer flocculants useful herein are generally high molecular vinyl addition polymers which incorporate a cationic functional group. These polymers are generally homopolymers of water soluble cationic vinyl monomers, or may be copolymers of a water soluble cationic vinyl monomer with a nonionic monomer such as acrylamide or methacrylamide. The polymers may contain only one cationic vinyl monomer, or may contain more than one cationic vinyl monomer. Alternatively, certain polymers may be modified or derivatized after polymerization such as polyacrylamide by the mannich reaction to produce a cationic vinyl polymer useful in the invention. The polymers may have been prepared from as little as 1 mole percent cationic monomer to 100 mole percent cationic monomer, or from a cationically modified functional group on a post polymerization modified polymer. Most often the cationic flocculants will have at least 5 mole percent of cationic vinyl monomer or functional group, and most preferably, at least 10 weight percent of cationic vinyl monomer or functional group.

Suitable cationic vinyl monomers useful in making the cationically charged vinyl addition copolymers and homopolymers suitable for this invention will be well known to those skilled in the art. These materials include: dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, mannich reaction modified polyacrylamides, diallylcyclohexylamine hydrochloride (DACHA HCl), diallyldimethylammonium chloride (DADMAC), methacrylamidopropyltrimethylammonium chloride (MAPTAC) and allyl amine (ALA). Cationized starch may also be used as a flocculant herein. The flocculant selected may be a mixture of those stated above, or a mixture of those stated above with a cationic starch. Those skilled in the art of cationic polymer based retention programs will readily appreciate that the selection of a particular polymer is furnish, filler, grade, and water quality dependent.

High molecular weight anionic flocculants which may be useful in this invention are preferably water-soluble or dispersible vinyl polymers containing 1 mole percent or more of a monomer having an anionic charge. Accordingly, these polymers may be homopolymers or water soluble anionically charged vinyl monomers, or copolymers of these monomers with for instance non-ionic monomers such as acrylamide or methacrylamide. Examples of suitable anionic monomers include acrylic acid, methacrylamide 2-acrylamido-2-methylpropane sulfonate (AMPS) and mixtures thereof as well as their corresponding water soluble or dispersible alkali metal and ammonium salts. The anionic high molecular weight polymers useful in this invention may also be either hydrolyzed acrylamide polymers or copolymers of acrylamide or its homologues, such as methacrylamide, with acrylic acid or its homologues, such as methacrylic acid, or with polymers of such vinyl monomers as maleic acid, itaconic acid, vinyl sulfonic acid, or other sulfonate containing monomers. Anionic polymers may contain sulfonate or phosphonate functional groups or mixtures thereof, and may be prepared by derivatizing polyacrylamide or polymethacrylamide polymers or copolymers. The most preferred high molecular weight anionic flocculants are acrylic acid/acrylamide copolymers, and sulfonate containing polymers such as those prepared by the polymerization of such monomers as 2-acrylamide-2-methylpropane sulfonate, acrylamido methane sulfonate, acrylamido ethane sulfonate and 2-hydroxy-3-acrylamide propane sulfonate with acrylamide or other non-ionic vinyl monomer. When used herein the polymers and copolymers of the anionic vinyl monomer may contain as little as 1 mole percent of the anionically charged monomer, and preferably at least 10 mole percent of the anionic monomer. Again, the choice of the use of a particular anionic polymer will be dependent upon furnish, filler, water quality, paper grade, and the like.

While most microparticle programs perform well with only a high molecular weight cationic flocculant, the colloidal silica sols of the invention may also be utilized with high molecular weight anionic water soluble flocculants with the addition of a cationic coagulant.

Nonionic flocculants useful in the invention may be selected from the group consisting of polyethylene oxide and poly(meth)acrylamide. In addition to the above, it may be advantageous to utilize so called amphoteric water soluble polymers in certain cases. These polymers carry both a cationic and an anionic charge in the same polymer chain.

The nonionic, cationic and anionic vinyl polymer flocculants useful herein will generally have a molecular weight of at least 500,000 daltons, and preferably molecular weights of 1,000,000 daltons and higher. Water soluble and/or dispersible flocculants useful herein may have a molecular weight of 5,000,000 or higher, for instance in the range of from 10 to 30 million or higher. The polymers suitable for the invention may be entirely water soluble when applied to the system, or may be slightly branched (two-dimensional) or slightly cross linked (three dimensional) so long as the polymers are dispersible in water. The use of polymers which are entirely water soluble is preferred, but dispersible polymers, such as those described in WO 97/16598, may be employed. Polymers useful may be substantially linear as such term is defined in Langley et. Al., U.S. Pat. No. 4,753,710. The upper limit for molecular weight is governed by the solubility or dispersibility of the resulting product in the papermaking furnish.

Cationic or amphoteric starches useful in the application of this invention are generally described in U.S. Pat. No. 4,385,961, the disclosure of which has been incorporated by reference into this specification. Cationic starch materials are generally selected from the group consisting of naturally occurring polymers based on carbohydrates such as guar gum and starch. The cationic starch materials believed to be most useful in the practice of this invention include starch materials derived from wheat, potato and rice. These materials may in turn be reacted to substitute ammonium groups onto the starch backbone, or cationize in accordance with the process suggested by Dondevne et al. in WO 96/30591. In general, starches useful for this invention have a degree of substitution (d.s.) of ammonium groups within the starch molecule between about 0.01 and 0.05. The d.s. is obtained by reacting the base starch with either 3-chloro-2-hydroxypropyl-trimethylammonium chloride or 2,3-epoxypropyl-trimethylammonium chloride to obtain the cationized starch. As will be appreciated, it is beyond the scope and intent of this invention to describe means for the cationizing of starch materials and these modified starch materials are well known and are readily available from a variety of commercial sources.

Various characteristics of the cellulosic furnish, such as pH, hardness, ionic strength and cationic demand, may affect the performance of a flocculant in a given application. The choice of flocculant involves consideration of the type of charge, charge density, molecular weight and type of monomers and is particularly dependent upon the water chemistry of the furnish being treated.

Other additives may be charged to the cellulosic furnish without any substantial interference with the activity of the present invention, such other additives include for instance sizing agents, such as alum and rosin, pitch control agents, extenders, biocides and the like. The cellulosic furnish to which the retention aid program of the invention is added may also contain pigments and or fillers such as titanium dioxide, precipitated and/or ground calcium carbonate, or other mineral or organic fillers. It may be possible, and it is within the spirit of the intention that the instant invention may be combined with other so called microparticle programs such as bentonite and kaolin. When papermakers change grades or furnishes it is possible that in certain situations the combination of the colloidal silica sols of the invention with other microparticles may be practical and desirable.

The colloidal silica sols of the invention may also be used in combination with a coagulant according to the teachings of Sofia et. Al., U.S. Pat. No. 4,795,531, the disclosure of which is hereinafter incorporated by reference into this specification. Sofia teaches a microparticle program in which a microparticle is utilized in the presence of a cationic coagulant and a high molecular weight charged flocculant.

The cationic coagulant materials which may find use in this aspect of the invention include well known commercially available low to mid molecular weight water soluble polyalkylenepolyamines including those prepared by the reaction of an alkylene polyamine with a difunctional alkyl halide. Materials of this type include condensation polymers prepared from the reaction of ethylenedichloride and ammonia, ethylene dichloride, ammonia and a secondary amine such as dimethyl amine, epichlorohydrin-dimethylamine, epichlorohydrin-dimethylamine-ammonia, polyethyleneimines, and the like. Also useful will be low molecular weight solution polymers and copolymers of vinyl monomers such as diallyldimethylammonium halides, especially diallyldimethylammonium chloride, dialkylaminoalkylacrylates, dialkylaminoalkylacrylate quaternaries, and the like where 'alkyl' is meant to designate a group having 1–4, and preferably 1–2 carbon atoms. Preferably 'alkyl' is methyl. These monomers are exemplified by such materials as dimethylaminoethyl acrylate, dimethylaminoethyl methacrylate and their water soluble quaternary ammonium salts. In certain cases cationic starch may be employed as the coagulant. Inorganic coagulants, e.g., alum and polyaluminum chloride, may also be used in this invention. The usage rate of inorganic coagulants is typically from 0.05 to 2 weight percent based on the dry weight of fiber in the furnish. The use of a coagulant with the colloidal silica sols of the invention is optional.

The method of the invention is applicable to all grades and types of paper products that contain the fillers described herein, and further applicable for use on all types of pulps including, without limitation, chemical pulps, including sulfate and sulfite pulps from both hardwood and softwood, thermo-mechanical pulps, mechanical pulps and groundwood pulps.

The amount of any mineral filler used in the papermaking process, generally employed in a papermaking stock is from about 10 to about 30 parts by weight of the filler per hundred parts by weight of dry fiber in the furnish, but the amount of such filler may at times be as low as about 5, or even 0, parts by weight, and as high as about 40 or even 50 parts by weight, same basis.

The following examples are intended to illustrate the invention and should not be construed as a limitation thereof

EXAMPLE 1

Preparation of a Colloidal Silica Sol of the Invention

Charge 285.8 pounds of soft water to a reactor containing a recycle pump, and begin recycling at a rate of 50 gallons per minute (gpm). Slowly add to the reactor 5.63 pounds of a 95% by weight sulfuric acid solution while cooling the contents of the reactor if necessary to lower the temperature below 75 degrees F. After allowing the contents of the reactor to circulate for 5 minutes, charge 289.5 pounds of sodium silicate having a mole ratio of $SiO_2$ to $Na_2O$ of 3.26 and a pH of 11.2. Apply cooling to prevent the reactor temperature from exceeding 81 degrees F. After the sodium silicate is added, start the addition of 3169.1 pounds of aqueous silicic acid (having a $SiO_2$ solids content of 6.40 percent by weight) at the rate of 13.20 pounds/minute (or 1.52 gallons/minute) while maintaining the temperature at 80 degrees F. When 75 percent of the silicic acid (2376.8 pounds) has been charged (approximately 3.0 hours), the temperature is slowly increased at the rate of 0.7 degrees F./minute until the temperature of 120 degrees F. is reached. Continue to add the silicic acid while heating the composition. The amount of time for the composition to reach 100 degrees F. is 10 minutes and the elapsed time to reach 115 degrees F. is 36 minutes. After all of the silicic acid has been added, the temperature of the composition is held at 120 degrees F. for one hour (i.e., start timing after the silicic acid addition has been completed). Thereafter, the temperature is held at 118–122 degrees F. whereupon ultrafiltration is applied to the composition for the purpose of increasing the solids concentration of the composition. Ultrafiltration is discontinued when the concentration of silica reaches 14.8–16.6 percent by weight, preferably 15.0 percent by weight.

The resulting colloidal silica composition of the invention is determined to have a specific gravity of 1.1048. a surface area of the silica of 804.3 $m^2/g$ and an S-value of 48.1. Moreover, after 45 days at room temperature the surface area of the silica is determined to be 751 $m^2/g$.

EXAMPLE 2

Charge a round bottom flask with 151.2 grams of deionized water and 4.0 grams of sodium sulfate and swirl until the sodium sulfate dissolves. Add 124.8 grams of sodium silicate to the flask while mixing. Heat the contents of the flask to 80° F. Add a total of 1720 grams of silicic acid, having a specific gravity of 1.039, to the flask over 4 hours at a rate of 7.2 grams per minute. After 860 grams or one-half of silicic acid is added, heat the content of the flask to a final temperature of 120° F. Continue to add the silicic acid while heating the composition. Thereafter, the temperature is held at 118–122° F. After the final addition at four hours, cool the reaction flask to room temperature whereupon ultrafiltration is applied to 350 grams of the composition for the purpose of increasing the solids concentration of the composition. Ultrafiltration is discontinued when measured amount of water removed reached 166.82 grams. The solids of the final composition is 16.12% by weight.

The resulting colloidal silica composition of the invention is determined to have a specific gravity of 1.1067. a surface area of 904m²/g and an S-value of 39. After thirty-three days, the surface area was measured to be 904 m²/g.

EXAMPLE 3
Preparation of a Colloidal Silica Sol of the Invention

Charge 285 pounds of soft water to the reactor containing a recycle pump, and begin recycling a rate of 50 gpm. Slowly add to the reactor 5.63 pounds of 95% by weight sulfuric acid solution while cooling the contents of the reactor if necessary to lower the temperature to 75° F. After allowing the contents of the reactor to circulate for 5 minutes, charge 290 pounds of sodium silicate having a mole ratio of $SiO_2$ to $Na_2O$ of 3.26 and a pH of 11.2. Apply cooling to prevent the reactor temperature from exceeding 81 degrees F. After the sodium silicate is added, start the addition of 3225 pounds of aqueous silicic acid (having a $SiO_2$ solids content of 6.37 percent by weight, a viscosity of 2.9 centipoise, a specific gravity of 1.0388 and a pH of 2.76) at the rate of 13.4 pounds/minute while maintaining the temperature at 80 degrees F. When 75 percent of the silicic acid (2419 pounds) has been charged (approximately 3.0 hours), the temperature is slowly increased at the rate of 0.7 degrees F./minute until the temperature of 120 degrees F. is reached. Continue to add the silicic acid while heating the composition. The amount of time for the composition to reach 100 degrees F. is 40 minutes and the elapsed time to reach 115 degrees F. is 57 minutes. After all of the silicic acid has been added, the temperature of the composition is held at 120 degrees F. for one hour (i.e.. start timing after the silicic acid addition has been completed). Thereafter, the temperature is held at 118–122 degrees F. whereupon ultrafiltration is applied to the composition for the purpose of increasing the solids concentration of the composition. Ultrafiltration is discontinued when the concentration of silica reaches 14.8–16.6 percent by weight, preferably 15.0 percent by weight.

The resulting colloidal silica composition of the invention is determined to have a specific gravity of 1.1033, a surface area of the silica of 786.4 m²/g and an S-value of 41. After 51 days, the surface area was measured to be 711.2 m²/g.

EXAMPLE 4
Preparation of a Colloidal Silica Sol of the Invention Charge a reaction vessel fitted with a screen near the bottom of the vessel with 226 gallons of Amberlite® IRC84SP ion exchange resin (available from Rohm & Haas) in its sodium form. Follow manufacturer's procedure for regenerating the resin to the hydrogen form such that the regeneration is at least 40 percent complete. Rinse the resin clean with water and drain the water.

Charge 1469 pounds of water into the vessel and start mixing the contents of the vessel to suspend the resin. Next, heat the contents of the reactor to 75 degrees F. Charge the reaction vessel (over a period of about 10 minutes) with 1231 pounds of sodium silicate (having a mole ratio of $SiO_2$ to $Na_2O$ of 3.26 and a pH of 11.2.) diluted with 564 pounds of water. Monitor the pH and the conductivity of the contents of the reaction vessel about every 10 minutes until the pH reaches 9.8 and the conductivity reaches 5800 μmho.

To the contents of the reactor, add 150 pounds of sodium silicate (as described above) to raise the pH to approximately 10.6. Stir the contents of the container for approximately 20 minutes, and thereafter remove the contents of the reaction vessel from the bottom through the screen. A small amount of water is rinsed through the resin to remove residual product and then mixed into the product.

The resulting colloidal silica composition of the invention is determined to have a specific gravity of 1.0877, a surface area of the silica of 927.4 m²/g, an S-value of 32, and a percent by weight $SiO_2$ solids content of 12.9 percent.

EXAMPLE 5
A. Preparation of Synthetic Standard Furnishes
Alkaline Furnish —The alkaline furnish has a pH of 8.1 and is composed of 70 weight percent cellulosic fiber and 30% weight percent filler diluted to an overall consistency of 0.5% by weight using synthetic formulation water. The cellulosic fiber consists of 60% by weight bleached hardwood kraft and 40% by weight bleached softwood kraft. These are prepared from dry lap beaten separately to a Canadian Standard Freeness (CSF) value ranging from 340 to 380 CSF. The filler was a commercial ground calcium carbonate provided in dry form. The formulation water contained 200 ppm calcium hardness (added as $CaCl_2$), 152 ppm magnesium hardness (added as $MgSO_4$), and 110 ppm bicarbonate alkalinity (added as NaHCO3).
Acid Furnish—The acid furnish consisted of kraft hardwood/softwood weight ratio, i.e., 60/40. As above, the fibers are refined separately to a 340 to 380 CSF prior to be combined with the filler and water. The total solids of the furnish comprised 92.5% by weight cellulosic fiber and 7.5% by weight filler. The filler was a combination of 2.5% by weight titanium dioxide, Titanox 1000 from DuPont, and 5.0 percent by weight kaolin clay. The water used to dilute the fiber and filler again contains additional salts as outlined in the alkaline furnish above. Other additives included alum dosed at 20 lbs active per ton dry solids. The pH of the furnish was adjusted with diluted 50% sulfuric acid such that the furnish pH was 5.0 after alum addition.
FBRM Data (Focused Beam Reflectance Measurement)

The Scanning Laser Microscopy employed in the following examples is outlined in U.S. Pat. No. 4,871,251, issued to Preikschat, F. K. and E. (1989) and generally consists of a laser source, optics to deliver the incident light to and retrieve the scattered light from the furnish, a photodiode, and signal analysis hardware. Commercial instruments are available from Lasentec™, Redmond, Wash.

The experiment consists of taking 300 mL of cellulose fiber containing slurry and placing this in the appropriate mixing beaker. Shear is provided to the furnish via a variable speed motor and propeller. The mixer is set at 720 rpm for all experiments herein. The propeller is set at a fixed distance from the probe window to ensure slurry movement across the window. A typical test sequence is shown below for both alkaline and acid furnishes.

TABLE VI

FBRM Test Protocol
Alkaline Furnish

| Time (minutes) | Action |
|---|---|
| 0.00 | Commence mixing. Record baseline floc size. |
| 0.50 | Add cationic starch. Record floc size change. |
| 0.75 | Add flocculant. Record floc size change. |
| 1.50 | Add the microparticle. Record floc size change. |
| 2.50 | Terminate experiment. |

TABLE VI

FBRM Test Protocol
Acid Furnish

| Time (minutes) | Action |
|---|---|
| 0.00 | Commence mixing. Record baseline floc size. |
| 0.50 | Add cationic starch and alum. Record floc size change. |
| 0.75 | Add flocculant. Record floc size change. |
| 1.50 | Add the microparticle. Record floc size change. |
| 2.50 | Terminate experiment. |

The change in the mean chord length of the flocs after the addition of the microparticle dose has been correlated with Dynamic Drainage Jar retention measurements. Hence, the greater the change in mean chord length induced by the treatment, the higher the retention value.

Physical Properties of Test Material.

The following materials are used in the examples of this patent and their physical properties are define below.

| Sample Id | Description | Initial Surface Area m²/g | S-Value |
|---|---|---|---|
| CCS | Conventional Colloidal Silica | 680 | 63.4 |
| Sample 1 | Made via Example 1 | 970 | 42.0 |
| Sample 2 | Made via Example 2 | 904 | 39.0 |
| Sample 3 | Made via Example 3 | 883 | 32.7 |
| Sample 4 | Made via Example 3 | 927 | 32.0 |

B(1). Improved Retention in Acid Furnish

A synthetic acid furnish was prepared as outlined above in "Standard Synthetic Furnishes". FBRM experiments were carried with the following results.

| Dose in Actives | Change in mean chord | | | % Improvement | | |
|---|---|---|---|---|---|---|
| | Conventional Colloidal | Sample | | Conventional Colloidal | Sample | |
| lbs/ton | Silica | 1 | 2 | Silica | 1 | 2 |
| 0.5 | 5.80 | 8.45 | 10.40 | 0.0% | 45.7 | 79.3% |
| 1.0 | 13.80 | 19.30 | 19.12 | 0.0% | 39.9% | 38.6% |
| 2.0 | 19.70 | 33.73 | 31.55 | 0.0% | 71.2% | 60.2% |

As can be seen in the data above, the materials which are the subject of the current patent demonstrate some 60 to 70% improvement at a dose of 2 lbs/ton in the ability to increase the degree of flocculation in this synthetic acid furnish.

B(2). Improved Retention in Alkaline Furnish

In a similar way, materials were tested in the "Standard Alkaline Synthetic Furnish." Likewise, FBRM experiments were carried out and the results are summarized below.

| Dose in Actives | Change in mean chord | | | % Improvement | | |
|---|---|---|---|---|---|---|
| | Conventional Colloidal | Sample | | Conventional Colloidal | Sample | |
| lbs/ton | Silica | 1 | 2 | Silica | 1 | 2 |
| 0.5 | 3.80 | 10.39 | 6.41 | 0.0% | 173.4% | 68.7% |
| 1.0 | 8.50 | 18.30 | 19.05 | 0.0% | 115.3% | 124.1% |
| 2.0 | 12.10 | 34.79 | 29.64 | 0.0% | 187.5% | 145.0% |

The results above demonstrate that materials made via the process herein provide higher retention in alkaline furnishes than conventional colloidal silicas. In this case, the improvement is from 50 to >100% over the conventional colloidal silica.

In yet another experiment involving a synthetic alkaline furnish as described above, the following results were found.

| Dose in Actives | Change in mean chord | | % Improvement | |
|---|---|---|---|---|
| | Conventional Colloidal Silica | Sample 3 | Conventional Colloidal Silica | Sample 3 |
| lbs/ton | | | | |
| 0.5 | 4.13 | 12.37 | 0.0% | 199.5% |
| 1.0 | 11.98 | 28.68 | 0.0% | 139.4% |
| 2.0 | 18.73 | 44.35 | 0.0% | 136.8% |

In the study above, the subject patent material improved the degree of flocculation in synthetic alkaline furnish by over 100% compared to that of conventional colloidal silica. Hence, the subject materials provide marked improvement in retention of alkaline paper furnishes.

C. Drainage improvements

Drainage was measured using a Vacuum Drainage Tester, from Nalco Chemical Co. A 500 mL volume of stock was placed in the stock reservoir of the instrument, dosed with additives while under agitation, and drained. Drainage of the stock occurred under vacuum, in this case, onto a Filpako #716 cellulose filter paper. The time required from the start of drainage until air was pulled through the pad was recorded as the "drain time". The final vacuum value, read from the vacuum gage, was recorded 10 seconds after the vacuum break. The vacuum level applied was 14 in. of Hg and the mixing speed was 900 rpm, controlled by a digital Cole-Plamer ServoDyne Mixer System Controller.

The furnish used in this testing was an alkaline furnish composed of softwood at 13% hardwood at 49.4%, groundwood at 6.0% and broke of 31.6%. The consistency was 1.0%. Starch, Stalock cationic starch, was added at 40 lbs/ton. The flocculant consisted of a 10 mole % cationic polyacrylamide, cPAM. It was added at 0.6 lbs/ton. The addition sequence was as follows:

| Sequence Time (sec) | Action |
|---|---|
| 0 | Add furnish, start agitator at 900 rpm. |
| 10 | Add starch. |
| 20 | Add cPAM. |
| 40 | Add microparticle. |
| 50 | Stop mixing and transfer to VDT. |
| 60 | Start drainage test. |

Besides the drain time and final vacuum, the drainage rate, defined as the time needed to drain 300 mL of filtrate, was also recorded. The results are tabulated below.

|  | Dose (lbs/ton) | | Time (sec) | | |
| --- | --- | --- | --- | --- | --- |
| Description | Flocculant | Microparicle | Rate | Drain | Final Vac |
| Blank | 0 | 0 | 35.0 | 75.0 | 13.5 |
| Flocculant only | 0.6 | 0 | 11.2 | 25.7 | 10.2 |
| CCS | 0.6 | 1 | 8.9 | 18.2 | 9.0 |
| CCS | 0.6 | 2 | 8.3 | 16.7 | 8.5 |
| CCS | 0.6 | 3 | 7.4 | 15.6 | 8.0 |
| Sample 4 | 0.6 | 1 | 6.5 | 12.3 | 6.3 |
| Sample 4 | 0.6 | 2 | 5.8 | 11.1 | 4.6 |
| Sample 4 | 0.6 | 3 | 5.7 | 11.1 | 4.6 |

As seen in this data, the subject patent material i.e., Sample 4, increased the drainage rate by a factor of 7 over the blank and by about 2 over the flocculant only treatment. Similar improvements are observed in the drain time and final vacuum. Hence, the subject materials improve the drainage.

What is claimed is:

1. A process for preparing a stable colloidal silica having an S-value of from 20–50 and wherein said silica has a surface area of from about 700 $m^2/g$ to about 970 $m^2/g$ and comprising:
   (a) forming an initial composition containing water, an alkali metal silicate having a mole ratio of $SiO_2$ to alkali metal oxide in the range of from 15:1 to 1:1 and a pH of at least 10, and a compound selected from the group consisting of an acid, a corresponding salt thereof and a mixture thereof, said alkali metal silicate and said compound being initially present in a ratio by weight of at least 63:1, while maintaining the temperature of said initial composition below 90 degrees Fahrenheit;
   (b) slowly and continuously adding to said initial composition an aqueous silicic acid composition having a $SiO_2$ content in the range of from 4.0 to 8.5 percent by weight while maintaining the temperature below 90 degrees Fahrenheit until from one-half to three-quarters of said silicic acid composition has been added to said initial composition;
   (c) slowly increasing the temperature of said composition to from 115–125 degrees Fahrenheit and maintaining the temperature until the addition of the silicic acid composition is complete;
   (d) optionally, maintaining the temperature of the composition below 125 degrees Fahrenheit for about an hour; and
   (e) discontinuing said heating and optionally removing water from said composition until the solids content based on $SiO_2$ of said stable colloidal silica is from about 7 percent by weight to about 20 percent by weight.

2. The process of claim 1 wherein in step (b) said temperature is maintained in a range of from 60 to 90 degrees Fahrenheit.

3. The process of claim 1 wherein in step (d) said temperature is maintained at from 115–125 degrees Fahrenheit.

4. The process of claim 1 wherein in step (e) water is removed from said composition until the solids content is 10 percent by weight or higher.

5. A process for preparing a stable colloidal silica having an S-value of from 20–50 and wherein said silica has a surface area of from about 700 $m^2/g$ to about 970 $m^2/g$ comprising:
   (a) charging a reaction vessel with a cationic ion exchange resin having at least 40 percent of its ion exchange capacity in the hydrogen form wherein said reaction vessel has means for separating said colloidal silica from said ion exchange resin;
   (b) charging said reaction vessel with an aqueous alkali metal silicate having a mole ratio of $SiO_2$ to alkali metal oxide in the range of from 15:1 to 1:1 and a pH of at least 10.0;
   (c) stirring the contents of said reaction vessel until the pH of said contents is in the range of from 8.5 to 11.0;
   (d) adjusting the pH of the contents of said reaction vessel to above 10.0 using an additional amount of said alkali metal silicate; and
   (e) separating the resulting colloidal silica from said ion exchange resin while removing said colloidal silica from said reaction vessel.

6. The process of claim 5 wherein said means for separating said colloidal silica from said ion exchange resin comprises a screen near the bottom of said reaction vessel.

7. The process of claim 5 wherein in step (c) the pH of said contents is in the range of from 9.2 to 10.0.

8. The process of claim 5 wherein in step (a) the molar ratio of hydrogen ion in said cationic exchange resin to alkali metal ion in said alkali metal silicate is in a range of from 40 to 100 percent.

9. The process of claim 5 wherein in step (c) the contents of said reaction vessel are maintained at from 50 degrees to 100 degrees Fahrenheit.

10. The process of claim 5 wherein in step (c) the pH of said contents is in a range of from 9.2 to 10.5.

11. The process of claim 5 wherein in step (d) the pH of said contents of the reaction vessel is adjusted to from 10.4 to 10.7.

* * * * *